April 7, 1931. H. E. WALKER 1,799,713
RIBBON SPACING REEL
Filed March 14, 1928 2 Sheets-Sheet 1
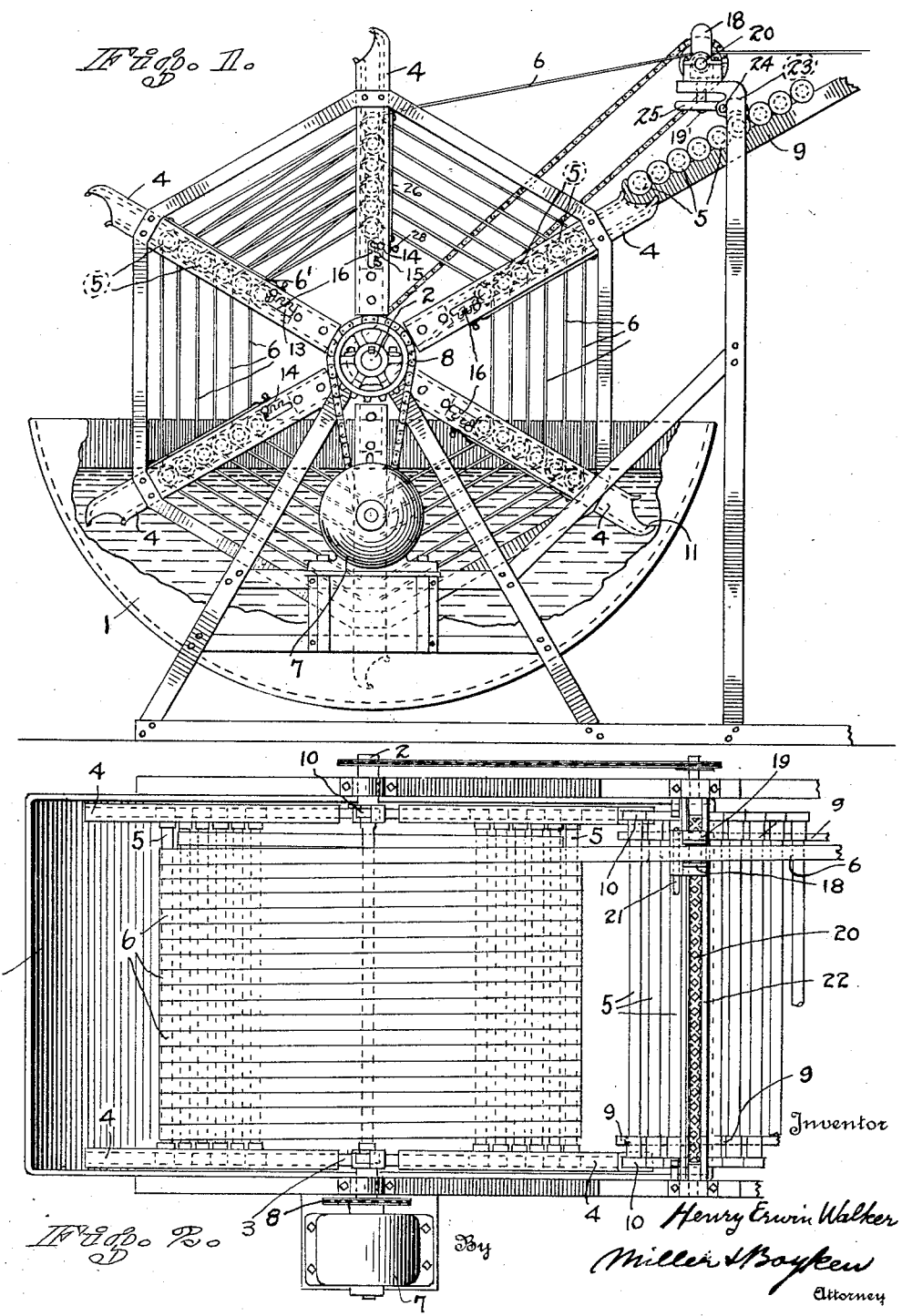

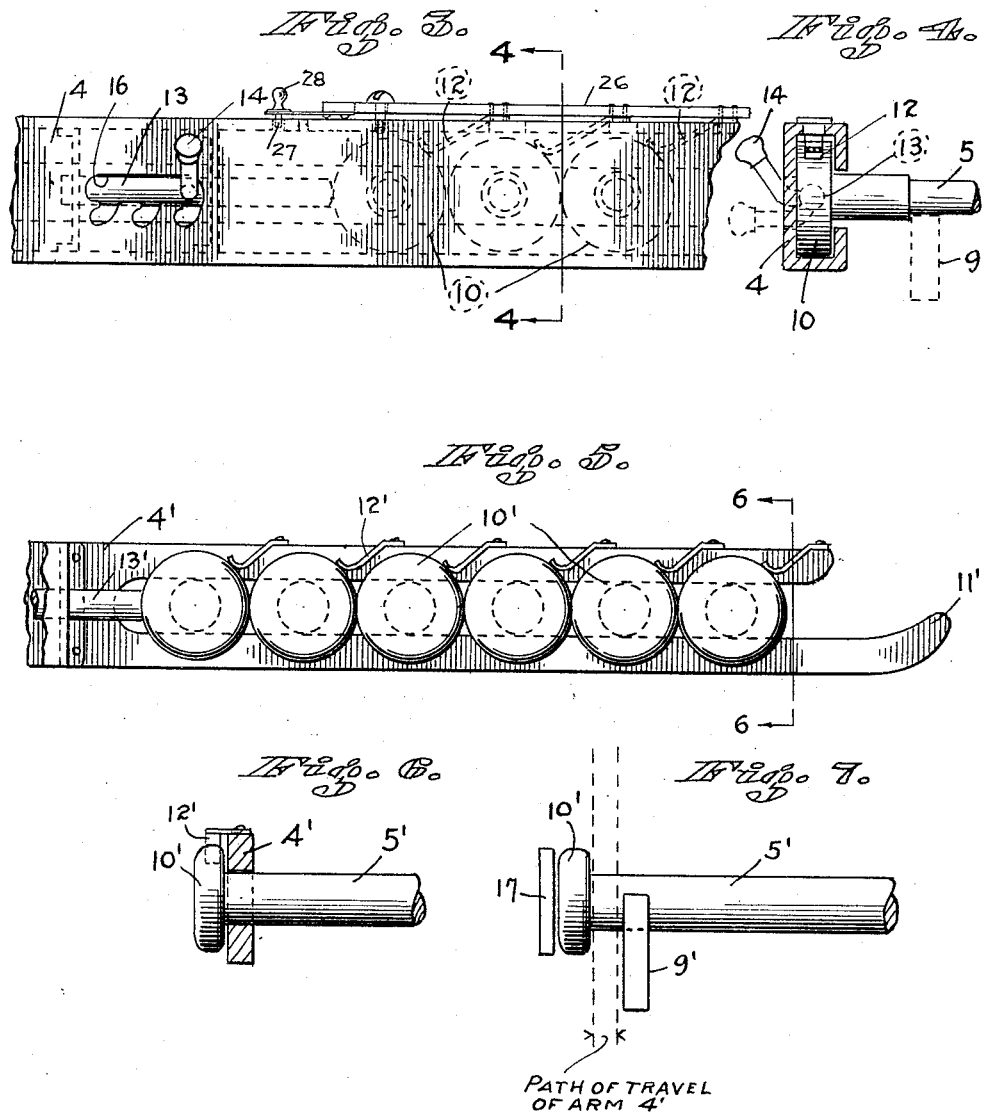

Patented Apr. 7, 1931

1,799,713

UNITED STATES PATENT OFFICE

HENRY ERWIN WALKER, OF PORTLAND, OREGON

RIBBON-SPACING REEL

Application filed March 14, 1928. Serial No. 261,520.

This invention relates to reels about which ribbons of material are wound in spaced coils for treatment of the ribbon by chemicals by revolving the reel in a bath thereof.

The objects of the invention are to provide apparatus of the kind outlined which will be particularly adapted for treatment of ribbons of material in dyeing baths, and which will automatically space the ribbon coils as they are wound on the reel, also such a reel which will automatically space the coils laterally as well as radially as they are wound thereon, also such a reel in which the tension of the wound ribbon may be varied or relieved to prevent too great a pressure of the ribbon layers upon the reel rods in dyeing so as to avoid uneven dyeing of the goods.

Other objects and advantageous construction of my apparatus will appear in the following description.

In the drawings accompanying this application Fig. 1 is a side elevation of my improved ribbon spacing reel mounted to revolve in a solution-holding tank and with part of the tank broken away so as to more clearly reveal the improved features.

Fig. 2 is a plan view of Fig. 1.

Fig. 3 is an enlarged fragmentary view of one arm of the reel with some of the transverse rods in place.

Fig. 4 is a section of the arm of Fig. 3 as seen from the line 4—4 thereof.

Fig. 5 is a side view of a portion of an arm of modified form from the arm of Fig. 3.

Fig. 6 is a section of Fig. 5 as seen from the line 6—6 thereof.

Fig. 7 is an end view of a portion of a rod-feeding rack as would be used with arms of the construction shown in Fig. 5.

Briefly described, my invention comprises a reel revolvably mounted over a tank so that its lower portion will revolve through a solution placed in the tank.

Means is provided for feeding a ribbon to the reel for winding thereon with a spooling motion to transversely space the layers of ribbon. The reel has radially projecting arms at each end of its hub and after the coil of ribbon is carried the length of the reel a transversely extending rod is automatically placed between each pair of arms so as to receive the next coil of ribbon in spaced relation from the first coil.

When the coils are all in place the end of the ribbon is secured to any convenient part of the reel and the whole revolved in the dye or other bath.

To prevent too much tension of the ribbon coils upon the transverse rods, the rods carried by one or more arms may be moved inward toward the hub of the reel so as to produce a slack throughout the ribbon as may be desired.

In the drawings the tank is designated 1, the reel axle 2, hub construction 3, arms 4, transverse rods 5, and ribbon thereon 6.

The reel is rotated by any suitable means, such as a motor 7 and chain gearing 8, and it is preferable that the motor be of reversing type or the transmission incorporate any of the well known construction so that the reel may be revolved in either direction, or successively in opposite directions while treating the material.

The rods are supplied to the arms from an inclined rack 9 and at certain intervals the arms each pick up a rod from the rack as the reel revolves so as to give a new or larger diameter upon which the ribbon is wound.

Various forms of arms and rods may be employed to operate as described, and in Figs. 1 to 4 the arms 4 are shown as of metal of channel shape, and the rods 5 provided with heads 10 adapted to be freely received by the channels so that a rod picked up by a pair of arms will roll or slide inward or toward the hub of the reel.

The end of each arm is cut away to form a hook 11 so as to engage and pick a rod from the rack, and as the rods roll down the arms they lift light springs 12 or other suitable detents so that they will not fall out in the revolving of the reel before sufficient ribbon has been wound around them to hold them in place.

These light springs 12 are preferably all secured to a flat bar 26 slidably mounted on the arm, and with the springs projecting through openings in the arm, so that upon outward sliding of the bar 26 the springs will be lifted and all the rods be free to fall from or be removed from the arm. A spring latch 27 operated by a knob 28 serves to hold the bar at either end of its travel.

The first rod in each pair of arms is temporarily stopped at the desired inward point of travel by means which may be later removed to permit further inward movement. Such means here being represented in a bolt 13 slidably mounted in the arm and which bolt may be set in different positions by engagement of the neck of its operating knob 14 with any of the notches 15 in a slot 16 formed in the arm, as best shown in Figs. 3 and 4.

Instead of the arms being channel shape they may be simply slotted as indicated in Figs. 5 and 6 wherein the same designating characters are used though primed. In using arms as per Figs. 5 and 6 the heads 10' of the rods at each end thereof should fall to the outsides of the reel arms, and also will require an aligning guide of some sort while on the delivery or feeding rack 9', such a guide being indicated by a fixed plate 17 arranged at each side of the rack.

In Fig. 4 the rods are aligned on the rack 9 by means of the hubs of heads 10 as indicated, though any other means accomplishing this purpose may be employed.

In winding the ribbon 6 upon the reel it passes between fingers 18 of a spooling device for lateral spacing of the coils. Such spooling devices are common in the art and therefore no superfluous details will be incorporated here, suffice to say that the device here shown includes a traveling nut 19 carried back and forth on a cross-threaded screw rod 20 suitably driven from the reel to suitably space the particular ribbon being wound on the reel. This spooling drive may be definitely changed in speed ratio to suit a particular ribbon, or it may incorporate any of the well known speed changing construction so as to be adjustable in its ratio.

In any event, the nut is suitably equipped internally with reverse thread engaging members (not shown) tripped by alternate striking of a slidable trip rod 21 upon the bearing for the screw at opposite ends of travel of the nut, so that the nut will snap out of engagement with one thread and engage the opposite thread at each end of its travel along the screw.

A suitable guide 22 is provided to prevent the nut from rotating.

Also, at each end of travel the nut trips a new set of rods for the reel arms for outwardly spacing the next layer of ribbon.

This is accomplished by providing an escapement or stop 23 at both ends of the rods to drop a given number only of rods (as many as there are arms on the reel) and of tripping this escapement at each end of travel of the spooling nut.

The escapement may consist of levers 23 secured to a revolvable axle 24 and each lever provided with an extension 25 over which a lug 19' of the nut 19 rides so as to lift the levers 23 out of the path of the rods on the rack and permit a new set to fall into place for picking up by the arms. Fig. 1 indicates the above operation as just having taken place, and the lever dropped.

In operation, the end 6' of a ribbon is first secured to the hub of the reel and the device is started. The supply of ribbon received from any suitable source, preferably under slight tension passes over the spooling device for lateral spacing, while at each end of the spooling device travel a new set of rods is automatically positioned in the reel arms.

When the reel is full the ribbon is cut and its outer end secured in any manner either to one of the outermost rods, or to one of the arms.

To relieve the tension on the coils, or prevent excessive tension from developing through shrinkage of the ribbon through dyeing or other treatment, one or more of the bolts 13 may be retracted to the point desired.

In considering my invention as above disclosed it is apparent that the device is not limited to a ribbon dyeing reel, as my reel construction may be used for any purpose wherein a series of spooled and spaced layers of material such as ribbon, tape, thread, cord, rope, hose, or photographic film, may be required such as treatment with chemicals, steam, gas, air, heat, or it may be used for drying the bands thereon, or for any chemical treatment, followed by washing and drying.

It is also evident that the whole device may be enclosed if desired to facilitate any special treatment of the goods reeled thereon, also it should be noted, that while I show a spiral layer of material on my reel, if the band or material is very wide it may simply be in outwardly spaced relation, or if desired any number of layers spiral or otherwise may be wound on one set of rods before going to the next set as may be useful with thin material, and thus the capacity of the machine may be increased.

In addition to the above it is obvious that it may have use apart from a tank beneath it, as for high speed drying of the treated band or bands of material, as it may be run at any desired speed, and it is therefore obvious without additional sheets of drawings that the tank may be made removable from the reel, or the reel raisable out of the tank if desired as is common with dyeing reels used in the art, and the above and any other application of my invention are intended to be covered in my appended claims.

I claim:

1. In apparatus for reeling strip material, the combination of a reel revolvably mounted, means for supporting transversely extending rods in spaced relation at points around said reel, and means for feeding said rods to said reel while revolving, said last mentioned means including a trip adapted for delivering a predetermined number of rods to said reel and controlled by the revolutions thereof.

2. In apparatus for reeling strip material, the combination of a reel revolvably mounted, means for supporting transversely extending rods in spaced relation at points around said reel, and means for feeding said rods to said reel while revolving, said last mentioned means including a trip adapted for delivering a predetermined number of rods to said reel, and means for actuating said trip intermittently controlled by the revolutions of the reel.

3. In apparatus for reeling strip material, the combination of a reel revolvably mounted and provided with confronting radial arms at opposite ends, radial guides on the arms, and a plurality of rods adapted to extend lengthwise of the reel engaging the guides of confronting arms, means on the arms arranged and adapted for permitting inward movement of said rods along the guides of the arms while resisting outward movement.

4. In apparatus for reeling strip material, the combination of a reel revolvably mounted and provided with confronting radial arms at opposite ends, radial guides on the arms, and a plurality of rods adapted to extend lengthwise of the reel engaging the guides of confronting arms, means on the arms arranged and adapted for permitting inward movement of said rods along the guides of the arms while resiliently resisting outward movement.

5. In apparatus for reeling strip material, the combination of a revolvably supported reel provided at its ends with radial guides in confronting relation, rods adapted to extend longitudinally of the reel engaged at their ends by said confronting guides, and means for radially spacing the rods in said guides, said guides being open at their outer ends, a feeding rack adapted to hold a supply of said rods adjacent the outer ends of the guides, and means for successively feeding a rod from said rack to each pair of guides as the reel is revolved, and means for spooling a ribbon around said reel from rod to rod and back and forth longitudinally of the rods on the reel as the reel is revolved and a trip actuated at reverse movements of the spooling means to control delivery of said rods to said reel from said supply.

6. In apparatus for reeling strip material, the combination of a reel revolvably mounted and provided with confronting arms at its ends, each pair of said confronting arms arranged and adapted to receive and support a plurality of rods extending between them, means for varying the inward position of said rods on said arms, and means for securing said rods in the various inward positions as desired.

HENRY ERWIN WALKER.